United States Patent [19]

Ohtani

[11] 4,266,192
[45] May 5, 1981

[54] ROTATIONAL SPEED DETECTING APPARATUS

[75] Inventor: Yoshio Ohtani, Higashimatsuyama, Japan

[73] Assignee: Diesel Kiki Co., Ltd., Tokyo, Japan

[21] Appl. No.: 959,583

[22] Filed: Nov. 13, 1978

[30] Foreign Application Priority Data

Nov. 25, 1977 [JP] Japan .......................... 52-157497[U]

[51] Int. Cl.³ .............................................. G01P 3/48
[52] U.S. Cl. .................................... 324/168; 324/166; 324/174; 324/228
[58] Field of Search ............... 324/168, 169, 167, 166, 324/173, 174, 208, 235, 262, 228

[56] References Cited

U.S. PATENT DOCUMENTS

| 3,205,323 | 9/1965 | Deshautreaux | 324/228 |
|---|---|---|---|
| 3,253,099 | 5/1966 | Hess | 324/228 |
| 3,611,343 | 10/1971 | Schoenbach | 324/168 |
| 3,723,891 | 3/1973 | Whiteley | 324/166 |
| 3,898,563 | 8/1975 | Erisman | 324/174 |
| 3,936,754 | 2/1976 | Minami | 324/168 |

Primary Examiner—Michael J. Tokar
Attorney, Agent, or Firm—McAulay, Fields, Fisher, Goldstein & Nissen

[57] ABSTRACT

An apparatus for obtaining a signal relative to rotational speed of a rotary element is disclosed. The apparatus comprises a permanent magnet and a magnetic body which relatively approaches or moves away from the permanent magnet according to the rotational speed of a rotary member. A magneto-sensitive switch is operated in response to the change in intensity of the magnetic field produced by the relative motion between the permanent magnet and the magnetic body. Therefore, there can be obtained an apparatus which is small in size and high reliability.

3 Claims, 6 Drawing Figures

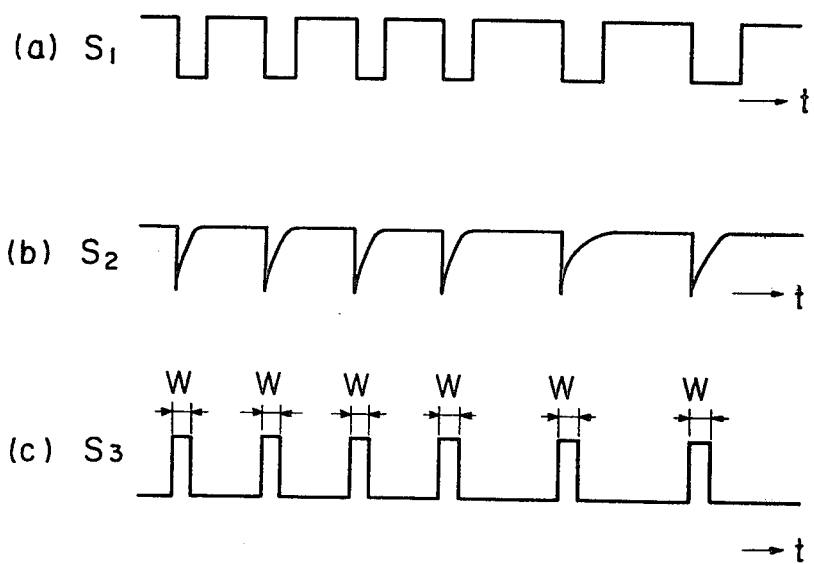

ROTATIONAL SPEED DETECTING APPARATUS

The present invention relates to an apparatus for detecting the rotational speed of a rotary element. More particularly, the invention relates to a rotational speed detecting apparatus for picking up signals of a frequency varying relatively to the rotational speed of a rotary member.

It is often required in various fields to pick up signals relative to the rotational speed of rotary members. For example, in a diesel engine, an electric signal having an intensity proportional to the rotational speed of the diesel engine should be produced for controlling an electric governor. For this purpose, a permanent magnet and a detecting coil, with which the flux of the permanent magnet is interlinked, are built in a screw plug disposed to confront a cam fixed to a rotation shaft of an injection pump. A rotational speed detector including such permanent magnet and detecting coil is arranged so that when the cam approaches or moves away from the screw plug, a rotation signal of a frequency proportional to the rotational speed of the rotation shaft is produced in the detecting coil. When the rotation number detector having the above-mentioned structure is employed, since the level of the voltage induced by the detecting coil of the rotational speed detector is in proportion to the density of the magnetic flux, the winding number of the coil and the speed of rotation, the output voltage is low while the engine is rotated at a low speed. Accordingly, in order to obtain a high output even under low speed rotation, it is necessary to use an expensive magnet having high energy efficiency and high retentiveness, or to increase the number of windings of the coil, resulting in increase of the manufacturing cost or size of the rotational speed detector. When a fine wire is used in order to diminish the size of the coil while increasing the number of windings, breaking of the wire readily occurs and the reliability of the detector is drastically reduced.

It is, therefore, a primary object of the present invention to provide a rotational speed detecting apparatus in which the foregoing defects involved in the conventional techniques can be eliminated.

Another object of the present invention is to provide a rotational speed detecting apparatus in which the level of the detection signals is not changed, even if the rotational speed is changed over a broad range, and detection signals precisely relative to the rotational speed can be obtained.

Still another object of the present invention is to provide a rotational speed detecting apparatus of small dimensions and high reliability.

In accordance with the present invention, there is provided a rotational speed detecting apparatus for obtaining signals relative to the rotational speed of a rotary member, which comprises a permanent magnet, a magnetic body which relatively approaches or moves away from the permanent magnet according to the rotational speed of the rotary member, and a magneto-sensitive switch which is turned on or off in response to the distribution of the intensity of the magnetic field produced by said permanent magnet, which is changed depending on the relative approaching or separating movement between said permanent magnet and magnetic body, wherein signals of a frequency varying relatively to the rotational speed of said rotary member are obtained according to the on-off operation of said magneto-sensitive switch.

In accordance with one preferred embodiment of the present invention, the magnetic body is fixed to the rotary member so that the magnetic body approaches or moves away from the permanent magnet according to the rotation of the rotary member, and the magneto-sensitive switch is disposed in the vicinity of the permanent magnet so that the magneto-sensitive switch performs the on-off operation in response to the distribution of the intensity of the magnetic field produced in the vicinity of the permanent magnet when the magnetic body approaches or moves away from the permanent magnet.

According to the present invention, by maintaining one end of the magneto-sensitive switch at a predetermined voltage, rotation signals of a frequency varying proportionally to the rotational speed can be picked up from the other end of the magneto-sensitive switch.

In the present invention, the permanent magnet may be fixed to the rotary member so that the permanent magnet approaches or moves away from the magnetic body according to the rotation of the rotary member.

According to the present invention, there can be attained various advantages. For example, the level of output signals is not changed even if the rotational speed of the rotary member is changed. Breaking of the windings of the coil is not caused at all and reliability is very high. Further, the detection accuracy can be remarkably improved over that of the prior art.

The present invention will now be described in detail with reference to the accompanying drawing, in which.

Figure 3:
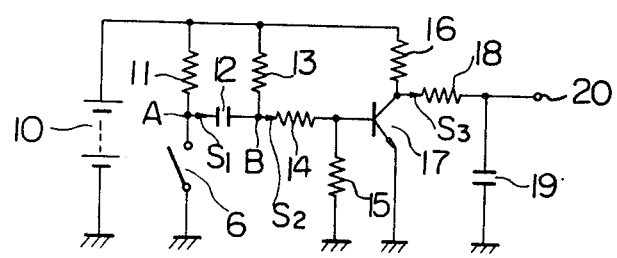
FIG. 3 is a circuit diagram illustrating an example of the circuit for obtaining analog signals having magnitude proportional to the rotational speed in the apparatus of the present invention.

FIGS. 4-A to 4-C are waveform diagrams illustrating the operations of the circuit shown in FIG. 3.

Figure 1:
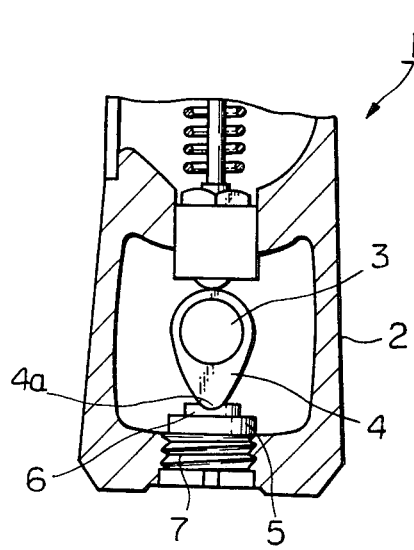
FIG. 1 is a sectional view illustrating one embodiment of the apparatus of the present invention.

Referring to FIG. 1, illustrating one embodiment of the rotational speed detecting apparatus of the present invention, a rotational speed detecting apparatus 1 for picking up rotation signals of a frequency varying according to the change of the rotational speed N of an internal combustion engine comprises: a cam 4, composed of a magnetic material, which is fixed to a cam shaft 3 mounted in a cylinder case 2 illustrated in section; a permanent magnetic piece 5 disposed in the vicinity of the cam 4, which approaches or moves away from a convex portion 4a of the cam 4 according to the rotation of the cam 4, and; a reed-type relay 6 which is a magneto-sensitive switch to which a driving magnetic field is applied by the permanent magnet piece 5, as described in detail hereinafter. The permanent magnet piece 5 and reed-type relay 6 are mounted on the head portion of a screw plug 7 screwed into the cylinder case 2.

Figure 2:
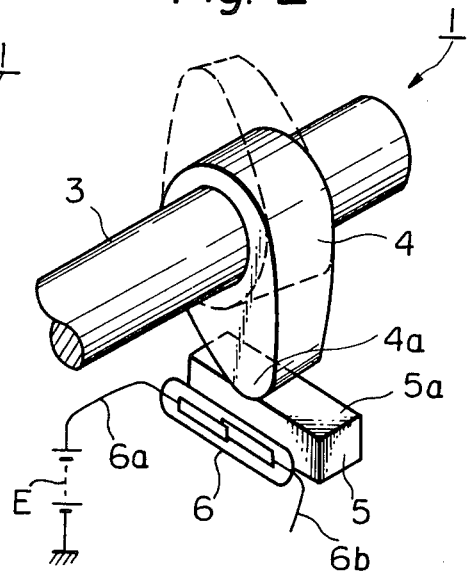
FIG. 2 is an enlarged perspective view illustrating the arrangement of main elements in the apparatus shown in FIG. 1.

FIG. 2 is a perspective view illustrating the arrangement of the respective elements of the rotational speed detecting apparatus 1. The permanent magnet piece 5 is a permanent magnet which is magnetized, by a surface magnetization technique, in a polarity indicated in the drawing. The cam 4 is disposed to confront a magnetized surface 5a of the permanet magnet piece 5, and the reed-type relay 6 is disposed in the vicinity of one side face of the permanent magnet piece 5. In this structure, when the cam shaft 3 is rotated according to the rotation of an engine (not shown), the convex portion 4a of the cam 4 approaches and moves away from the magnetized surface 5a of the permanent magnet piece 5, and the intensity of the magnetic field around the permanent magnet piece 5 is changed by this relative approaching and separating movement. Namely, when the convex portion 4a of the cam 4 approaches the magnetized surface 5a of the permanent magnet piece 5, the magnetic flux from the pole N of the permanent magnet piece 5 substantially returns to the pole S through the cam 4, especially the convex portion 4a thereof. Accordingly, in this case, the intensity of the magnetic field on the side face of the permanent magnet piece 5 is decreased. On the other hand, as the convex portion 4a of the cam 4 moves away from the magnetized surface 5a of the permanent magnet piece 5, the magnetic resistance gradually becomes uniform around the permanent magnetic piece 5. Namely, when the cam 4 is turned in a predetermined direction by 180° from the position indicated in FIG. 2 and the convex portion 4a arrives at a position indicated by a dotted line in FIG. 2, the magnetic resistance around the permanent magnet piece 5 becomes substantially uniform. Accordingly, the magnetic flux issued from the permanent magnet piece 5 is not concentrated on the magnetized surface 5a, but is distributed uniformly even in the vicinity of the side face of the permanent magnet piece 5. Therefore, the intensity of the magnetic field in the vicinity of the side face of the permanent magnet piece 5 is increased. The distances between the cam 4, permanent magnet piece 5 and reed-type relay 6 are adjusted so that, when the convex portion 4a of the cam 4 confronts the permanent magnet piece 5, the reed-type relay 6 is turned off, and; when the convex portion 4a does not confront the permanent magnet piece 5, the reed-type relay 6 is turned on. Accordingly, every time the engine makes one rotation, one on-off operation is performed in the reed-type relay 6, and the speed of this on-off operation of the reed-type relay 6 is changed in proportion to the rotational speed of the engine.

In the foregoing embodiment, the surface magnetizing technique is applied to the permanent magnet piece 5, in order to greatly change the intensity of the magnetic field imparted to the reed-type relay 6 by the relative approaching and separating movement between the convex portion 4a of the cam 4 and the permanent magnet piece 5. However, as will be apparent to those skilled in the art, the same function can be attained by using an ordinary bar-type permanent magnet or a permanent magnet piece.

Since the speed of the on-off operation of the reed-type relay 6 is changed in proportion to the rotational speed of the engine, as pointed out hereinbefore, if one terminal 6a of the reed-type relay 6 is connected to a constant voltage direct current power source E, pulse signals having a frequency varying according to the rotational speed N of the engine can be picked up from the other terminal 6b of the reed-type relay 6.

FIG. 3 illustrates an example of a circuit for obtaining analog signals having an intensity proportional to the rotational speed of the engine by using the rotational speed detecting apparatus 1 shown in FIG. 1. This circuit includes a reed-type relay 6 and resistor 11 connected in series to a battery 10. A pulse signal $S_1$, having a frequency proportional to the rotational speed of the engine, as shown in FIG. 4-A, is picked up from point A, and this signal $S_1$ is differentiated by a differentiation circuit including a condenser 12 and a resistor 13 to obtain a differentiated signal $S_2$ shown in FIG. 4-B from point B. This differentiated signal $S_2$ is input to a saturation amplification circuit, including resistors 14, 15 and 16, and a transistor 17, and is converted to a pulse signal $S_3$ having a predetermined pulse width W. The frequency of this pulse signal $S_3$ is changed according to the rotational speed N of the engine, but the pulse width W at the high level is kept constant irrespective of the change of the rotational speed N of the engine. Accordingly, in this pulse signal $S_3$, the mark-space ratio is proportional to the rotational speed N of the engine. Therefore, if this pulse signal $S_3$ is integrated by an integration circuit, including a resistor 18 and a condenser 19, an analog signal having a level changed in proportion to the rotational speed N of the engine can be obtained from an output terminal 20.

In the rotational speed detecting apparatus comprising a circuit having the above-mentioned structure, since the wave peak value of the pulse signal $S_1$ is always constant, irrespective of whether the rotational speed of the engine is high or low, the accuracy of the detected analog signal can be remarkably improved. Further, since the pulse signal $S_1$ is formed by the on-off operation of the switch, the voltage can be increased, and therefore, the reliability and detection accuracy can be remarkably improved over the conventional apparatus including a multiple-winding coil of fine wires.

What we claim is:

1. A rotational speed detecting apparatus for obtaining signals relative to the rotational speed of a rotating member comprising:

a permanent magnet;

means for retaining said permanent magnet in a fixed position relative to said rotating member, said permanent magnet having a face surface facing said rotating member;

said rotating member including a cam having a convex portion which moves towards and away from said face surface of said permanent magnet such that as said convex portion moves away the intensity of the magnetic field on said face surface is decreased and the magnetic resistance gradually becomes uniform around said permanent magnet, whereby the magnetic flux issued from said permanent magnet is distributed uniformly therefrom;

a magnetic body which realtively approaches or moves away from said permanent magnet according to the rotational speed of the rotating member;

a magneto-sensitive switch which performs an on-off operation in response to a change of the intensity of the magnetic field produced by the relative motion between said permanent magnet and said magnetic body, said magneto-sensitive switch being arranged adjacent to said permanent magnet, in an integral state;

a direct current voltage source which is connected to said switch so as to produce a pulse signal with a frequency which is varied in accordance with the speed of the on-off operation of said switch;

a differentiation circuit for differentiating the pulse signal; and, an integration circuit for integrating an output signal produced from said differentiation circuit.

2. Apparatus as recited in claim 1, wherein said permanent magnet is bar-shaped and includes two side surfaces connected with said face surface, and the magnetic flux issuing from said bar-shaped permanent magnet is increased as said convex portion moves away from said face surface; and, said magneto-sensitive switch includes reed-type relays juxtaposed to and facing said side surfaces and responsive to the magnetic flux issuing from said side surfaces.

3. A rotational speed detecting apparatus as recited in claim 2, wherein said permanent magnet is magnetized by a surface magnetization.

* * * * *